Feb. 12, 1935. G. D. PARKER Re. 19,459

METHOD OF SECURING COVERS TO CONTAINERS

Original Filed Dec. 15, 1926 11 Sheets-Sheet 1

INVENTOR
George D. Parker
BY
Harry A. Toulmin
ATTORNEY

Feb. 12, 1935. G. D. PARKER Re. 19,459

METHOD OF SECURING COVERS TO CONTAINERS

Original Filed Dec. 15, 1926 11 Sheets-Sheet 2

INVENTOR
George D. Parker
BY
Harry A. Totten
ATTORNEY

Feb. 12, 1935. G. D. PARKER Re. 19,459

METHOD OF SECURING COVERS TO CONTAINERS

Original Filed Dec. 15, 1926 11 Sheets-Sheet 3

INVENTOR
George D. Parker
BY
Harry A. Tolles
ATTORNEY

Feb. 12, 1935. G. D. PARKER Re. 19,459

METHOD OF SECURING COVERS TO CONTAINERS

Original Filed Dec. 15, 1926 11 Sheets-Sheet 4

INVENTOR
George D. Parker
BY
Harry F. Tolles
ATTORNEY

Feb. 12, 1935. G. D. PARKER Re. 19,459

METHOD OF SECURING COVERS TO CONTAINERS

Original Filed Dec. 15, 1926 11 Sheets-Sheet 5

INVENTOR
George D. Parker
BY
Harry A. Toller
ATTORNEY

Feb. 12, 1935. G. D. PARKER Re. 19,459

METHOD OF SECURING COVERS TO CONTAINERS

Original Filed Dec. 15, 1926 11 Sheets-Sheet 6

INVENTOR
George D. Parker
BY
Harry A. Toulmin
ATTORNEY

Feb. 12, 1935. G. D. PARKER Re. 19,459

METHOD OF SECURING COVERS TO CONTAINERS

Original Filed Dec. 15, 1926 11 Sheets-Sheet 7

INVENTOR
George D. Parker
BY
Harry A. Toulmin
ATTORNEY

Feb. 12, 1935. G. D. PARKER Re. 19,459

METHOD OF SECURING COVERS TO CONTAINERS

Original Filed Dec. 15, 1926 11 Sheets-Sheet 8

INVENTOR
George D. Parker
BY
Harry A. Tottin
ATTORNEY

Feb. 12, 1935. G. D. PARKER Re. 19,459

METHOD OF SECURING COVERS TO CONTAINERS

Original Filed Dec. 15, 1926 11 Sheets-Sheet 9

INVENTOR
George D. Parker
BY
Harry A. Tolles
ATTORNEY

Feb. 12, 1935. G. D. PARKER Re. 19,459

METHOD OF SECURING COVERS TO CONTAINERS

Original Filed Dec. 15, 1926 11 Sheets-Sheet 10

INVENTOR
George D. Parker
BY
Harry A. Toulmin
ATTORNEY

Feb. 12, 1935. G. D. PARKER Re. 19,459
METHOD OF SECURING COVERS TO CONTAINERS
Original Filed Dec. 15, 1926 11 Sheets-Sheet 11
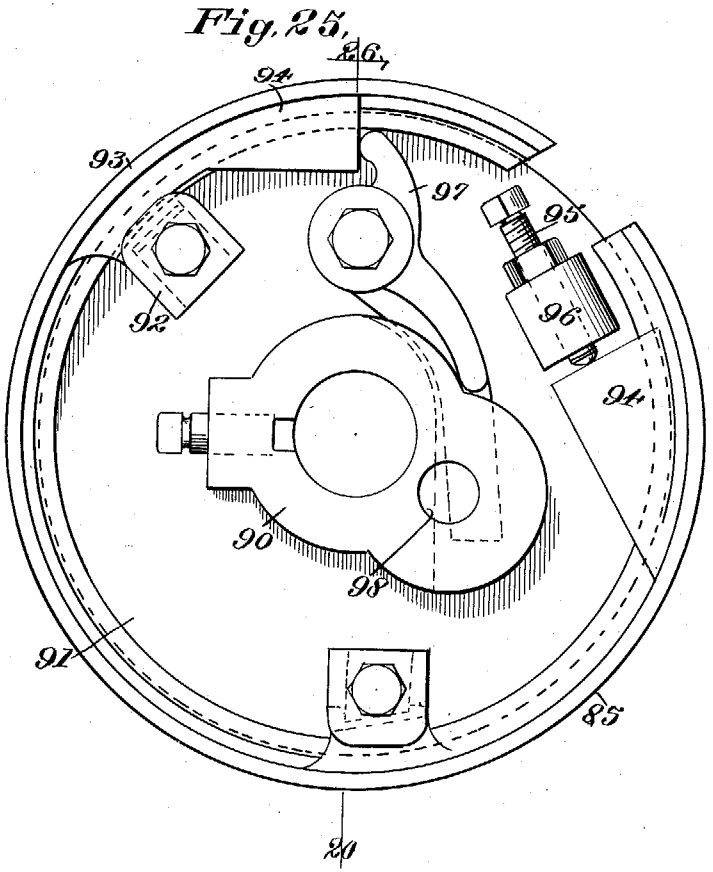
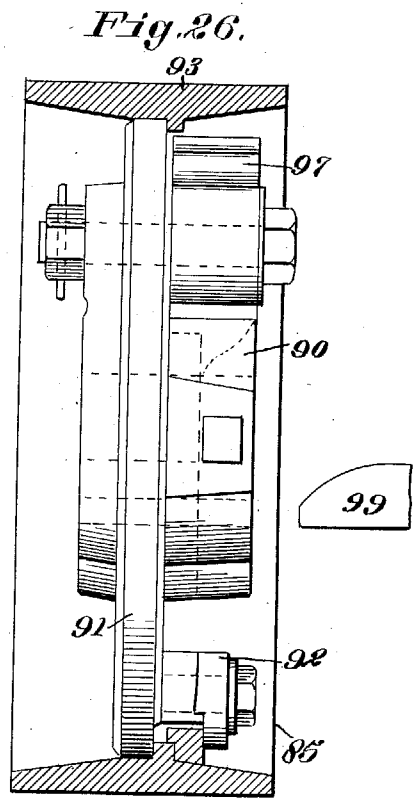
INVENTOR
George D Parker
BY
Harry A Potter
ATTORNEY Reissued Feb. 12, 1935

Re. 19,459

UNITED STATES PATENT OFFICE 19,459

METHOD OF SECURING COVERS TO CONTAINERS

George D. Parker, deceased, late of Riverside, Calif., by Donald Parker and Citizens National Trust and Savings Bank of Riverside, administrators, Riverside, Calif.

Original application December 15, 1926, Serial No. 154,938. Divided and this application November 14, 1927, Serial No. 233,293. Patent No. 1,715,780, dated June 4, 1929. Application for reissue October 1, 1934, Serial No. 746,480

6 Claims. (Cl. 140—93)

This invention relates broadly to a method for applying straps to containers so as to secure covers thereon and the disclosure is particularly designed to provide an automatic machine for applying straps to centers of the tops of orange boxes packed for shipment so as to retain the covers on the orange boxes in secure compressive relation upon the fruit.

The invention comprehends the method of forming the strap or straps of uniform size from suitable lengths of wire or strips of metal which may be round, flat or of any polygonal formation found most desirable for the purpose, and then preforming the ends to provide driving points in order that these driving points or ends may be driven into the material of a box or container in securing the cover thereon, and then applying the formed straps to the cover of a container, orange box or the like, and compressing the cover down upon the fruit or other contents within the box, and forming the end portions to fit the contour of the container or box and subsequently driving the ends into the box to secure the strap thereto while the cover is held compressed upon the fruit, whereby the rebound of the cover, when pressure thereon is released, will cause the cover to draw the strap taut and the strap will thus retain the cover on the container in compressed relation.

An important feature of the invention is the provision of a preformed strap from a suitable length of wire or the like, which may be secured to an orange box or other container to secure the cover thereon, merely by driving the ends into the material of the container.

The invention comprehends the provision of an automatic machine for carrying out the method of this invention to the extent of utilizing the preformed strap, which is provided with means for receiving a supply of straps for successive feeding to containers successively passed through the machine in the proper timed relation, to apply these straps to the containers over the covers and form the same in this application to fit the container and then drive the end into the material of the container for suitably securing the strap thereon to properly maintain the cover on the container.

This invention also provides for the assembly of a plurality of preformed straps into packages or fillers, by the use of special assembling means which are associated with the straps so as to retain them in similar relation in the assembled package for placement in a magazine of the automatic strapping machine in the proper predetermined relation for feeding by the machine to the container so as to obtain the proper application of all the straps to secure the covers on the containers.

The automatic machine forming the means for receiving and applying the preformed straps to a series of containers successively, is constructed so as to provide a minimum number of movable parts operated by a suitable manually controlled mechanism in proper timed relation, so that a series of containers are fed through the machine in one direction and the straps are fed from the magazine to the container in a direction laterally to the path of their travel in order that the application of the straps is continuous and automatic throughout the continued operation of the machine so long as containers are fed through the machine, and in which the parts are timed so as to arrest the motion of the container during the application of the strap thereto and the driving of the ends into the container for securing the strap and cover thereon. This invention comprehends numerous objects and results in the carrying out of the method of making the straps and applying them to the boxes and also in the construction and operation of the machine as more particularly pointed out in the following detailed description and in the claims, directed to the preferred method for carrying out the invention, it being understood that numerous other ways of performing the invention may be designed, which are clearly within the scope of the invention herein described and claimed.

In the drawings, forming a part of this application, which is a division of copending application Serial No. 154,938, filed December 15th, 1926, entitled Box straps and methods and means for applying the same to containers:—

Figure 25 shows a view of the clutch mechanism for connecting the drive motor with the cross head drive mechanism.

Figure 26 is a vertical sectional view, taken on the line 26—26 of Figure 25, portions being shown in elevation.

Figure 1:
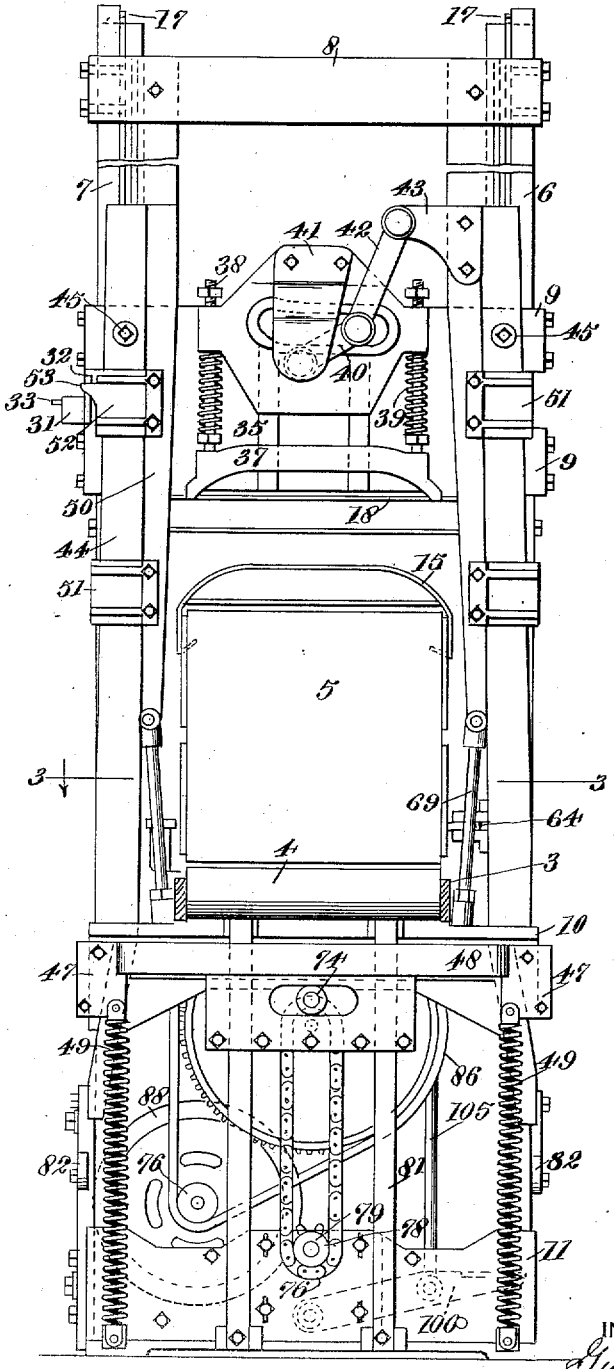
Figure 1 shows an end elevation of the machine, with a strapped box in operating position, and a strap suspended ready to receive another box, the press shoe being shown in elevated position.

The automatic machine forming part of this invention includes a frame work having opposite end frames 1 and 2 to which are secured, at their upper ends a pair of spaced parallel table rails 3, between which are journaled a plurality of conveyor rollers 4, to provide a suitable roller conveyor structure over which the boxes 5 are conveyed on this machine during the operation thereof for securing the tops to the boxes. Two central uprights 6 and 7 respectively form part of the frame work and are connected at their upper ends by the frame tie 8, also by the frame tie 9, intermediate the ends and in predetermined spaced relation below the upper frame tie 8. These two central uprights are also connected by the table frame tie 10 and floor frame tie 11. Suitable tie rods 12 connect the floor frame tie 11 with the respective end frames 1 and 2 as may be clearly seen in Figure 2.

Figure 2:
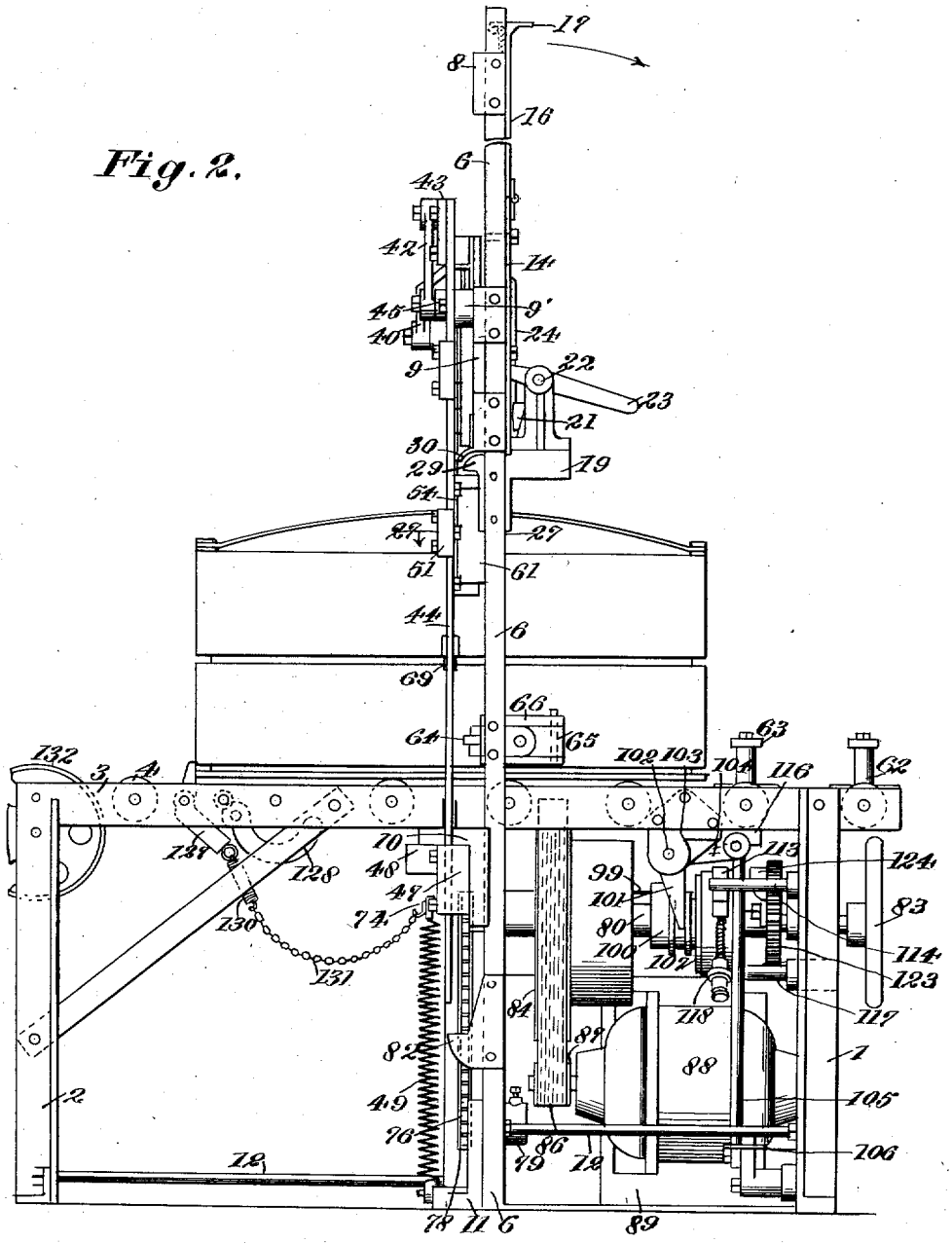
Figure 2 is a side elevation with a box shown in position to receive a strap.
Figures 12, 13, 14:
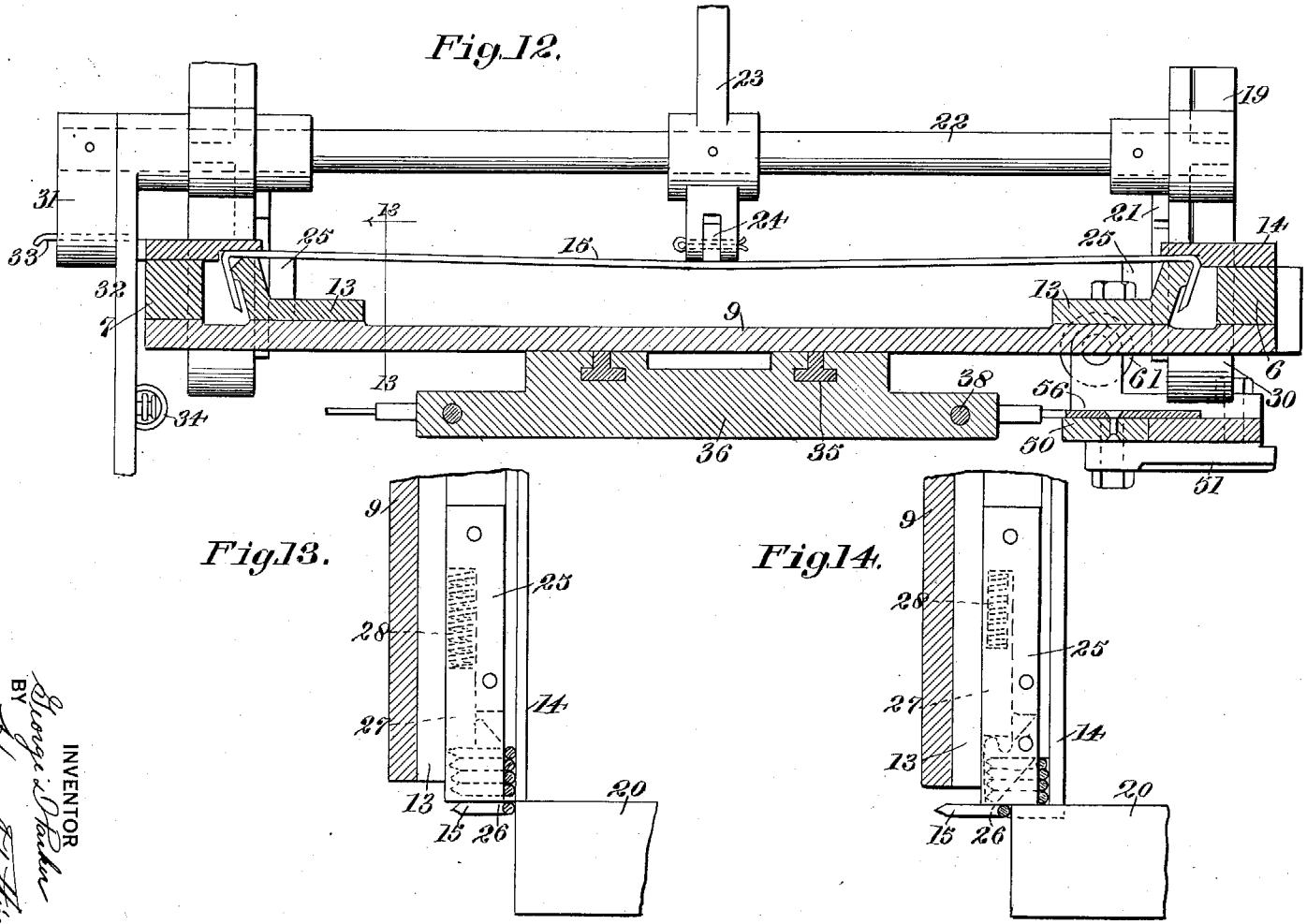
Figure 12 is a horizontal sectional view, showing the strap feeding mechanism taken on the line 12—12 of Figure 10.
Figures 13 and 14 are vertical sectional views, taken on line 13—13 showing the action of the strap retaining dogs in two operative positions.

Two strap guides 13 extend between the upper and central frame ties 8 and 9 respectively and are secured to said ties in adjacent spaced relation inside of the central uprights 6 and 7 as clearly shown in Figures 1 and 12. These strap guides form part of the machine strap magazine, which extends from the upper frame tie 8 to the lower edge of the central frame tie 9. This strap magazine is completed by cover plates 14 formed for cooperation with the guides 13 when secured to the uprights 6 and 7 to provide a narrow slot for receiving the ends of the straps 15 in slidable relation, as shown in Figure 12, these cover plates 14 being provided with hinged sections 16 at the upper ends thereof as shown clearly in Figure 2 which are adapted for outward movement relative to the central uprights 6 and 7, in order that the strap magazine may be replenished with straps by the insertion of suitable cards or fillers. Suitable spring operated lock members are mounted on the central uprights 6 and 7, as shown in Figures 1 and 2, and serve to retain the hinged section 16 of the strap cover plates in closed position.

The lower end of the strap magazine, as above set forth is at the lower edge of the central frame tie 9, from which position the straps are fed one by one to the driving mechanism for application in securing the covers on containers. The lowermost strap in the magazine is illustrated at 18 in Figure 1. The bottom of the strap magazine is formed by the castings 19 secured to the central uprights 6 and 7, as clearly shown in Figures 2, 9, 10, and 12. These castings are formed with dovetailed channels on the inner opposed faces slidably mounting the strap dogs 20, with which strap dog cranks 21 engage at one end for movement to operate said dogs for feeding straps from the magazine to the driving mechanism, the opposite ends of said strap dog cranks 21 being mounted on the rotatable shaft 22 in the bearings formed on the castings 19. The central portion of this shaft 22 is provided with a strap agitator crank 23 having a bifurcated projection extending toward the strap magazine and rotatably mounting the strap agitator bar 24 formed so that in the operation of the crank on shaft 22, the bar 24 will engage the strap 15 in the magazine and work the same downwardly toward the bottom thereof, in order that the lower strap in the magazine will always be in position to be fed by the machine. The strap dog 20 will engage the lowermost strap in each operation thereof to feed this lower strap to the driving mechanism.

Figure 10:
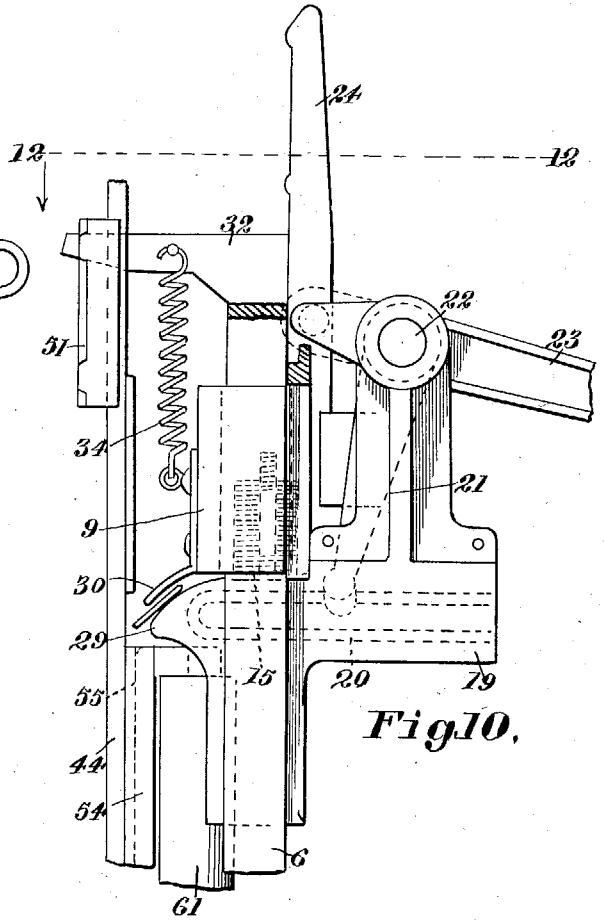
Figures 9 and 10 are side elevations showing the strap feeding mechanism in two extreme operating positions.
Figure 9:
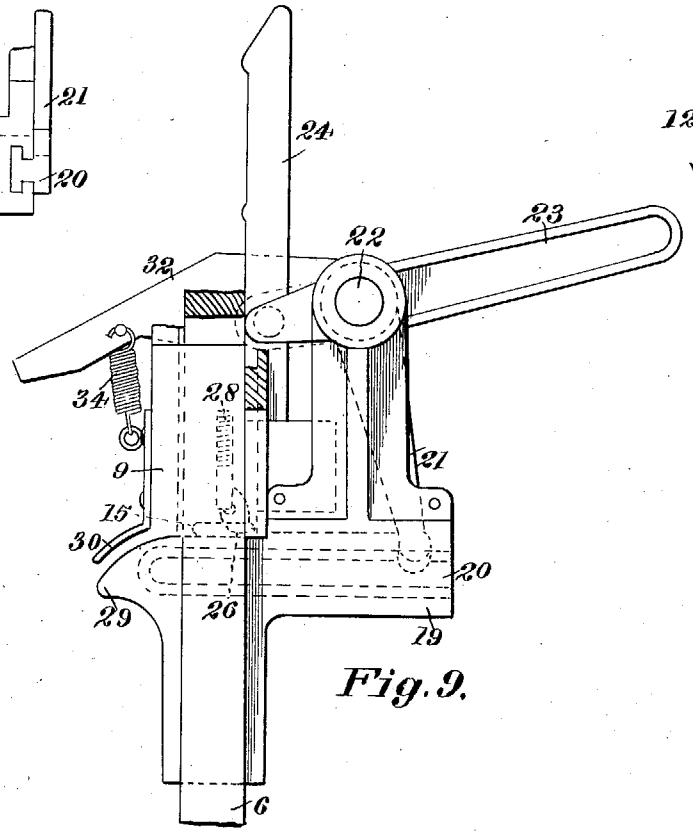
Figure 11:
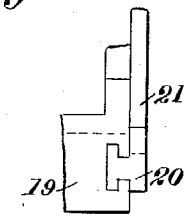
Figure 11 is a detail and elevation taken from the right-hand end of Figure 9, showing the manner of mounting one of the strap feeding bars for sliding movement.

On the lower end of the strap guide bars 13, and on the inner side thereof are mounted block members 25, which are recessed to receive the strap retainer dogs 26, pivotally mounted therein, as shown in Figures 13 and 14, which are normally projected and retained in the positions shown in Figure 13, by a plunger 27 projected downwardly in the block member 25 by the coil spring 28. These strap retainer dogs serve to retain the lower strap in position at the bottom of the magazine as shown in Figure 13, and to permit its discharge into the mechanism by the operation of the strap feed dog 20. Figures 13 and 14 clearly show the two operative positions of the strap retainer dogs for retaining the lowermost straps in superposed relation in the magazines, as shown in Figures 13 and 14, so as to prevent clogging of the machine, yet readily permitting the projection of the strap from the magazine by the feed dog. With further reference to Figures 9 and 10, there is shown at 29, a downwardly curved lip on the castings 19 on which the straps ride as they leave the magazine and are projected into the driving mechanism so that the ends of the straps will be in the proper driving position in entering the driving mechanism. Suitable guard fingers 30 are mounted in spaced relation over the lips 29 of each casting and suitably secured to the casting for co-operation in securing the proper guiding of the straps into the driving mechanism, Figure 10 showing one of the straps as it is leaving the magazine and entering the driving mechanism having the ends guided through the co-operation of the lip 29 and the guard 30.

The shaft 22 is extended beyond the upright 7 as shown in Figure 12 and mounts on the free end a crank 31, which is rigidly secured thereto, and adjacent which is rotatably mounted on the shaft the trigger 32. This trigger is adapted for operation by the driving mechanism in a manner which will be presently described, and transmits motion to the crank 31 through the provision of a suitable gear pin 33, which is used to protect the strap feeding mechanism from breakage in case any obstructions interfere with its operation. In case the strap becomes jammed in the magazine or in the feed mechanism, so as to obstruct the operation of the strap feed dog, the pin 33 will be sheared to prevent the breakage of parts of the feeding mechanism, and after the trouble is relieved the mechanism is again placed in operation by the insertion of a new shear pin in the opening adapted for alignment formed in the trigger 32 and the crank 31. Suitable coil springs 34 are secured to each trigger 32 and at the opposite ends to the central frame tie 9, for normally moving said trigger to its lower limit of movement, and operating the shaft 22 through the crank 31 so as to retract the strap feed dogs for the next successive strap feeding operation. This position of the parts is shown in Figure 9, while the end of the strap feeding stroke of the mechanism is shown in Figure 10.

On the opposite end of the center frame tie 9, from the strap magazine are formed ways 35, shown in Figure 1, on which is mounted the press shoe cross head 36 for free sliding movement up and down. The press shoe 37 shown in Figure 1 and in its several operative positions in Figures 5 to 8 inclusive, is carried by the press shoe cross head 36 by means of the slide rods 38 slidably extended through the cross head and receiving on the upper ends the suitably screw threaded lock nuts so that the projection of the press shoe below the cross head may be adjusted to a predetermined setting. The press shoe is normally projected downwardly from the cross head by means of the compression springs 39, abutting the cross head at the upper end, and suitable tension nuts screw threaded on the slide rods 38 at the lower ends, in order that the desired tension may be obtained in the projection of the press shoe 37, onto an orange box cover, in securing and strapping the cover in place. The cross head 36 is provided with a horizontal slot which curves upwardly at one end to conform to the swing of the radius link 40, pivotally secured at one end to the radius link bracket 41, carried by the upper end of the central frame tie 9. The opposite end of the radius link is provided with a stud rotatably mounting a roller, riding in the horizontal slot in the cross head so that the sliding movement of the cross head on the ways 35 is obtained by the operation of this radius link. A connecting rod 42 has one end pivotally connected to the radius link 40, through the means of the stud mounting the roller operating in the horizontal slot, while the opposite end of the connecting rod is pivotally secured to the bracket 43. The operation of the cross head, press shoe and the bracket carrying the connecting rod will now be presented in connection with the construction and operation of the driving mechanism.

Figure 5:
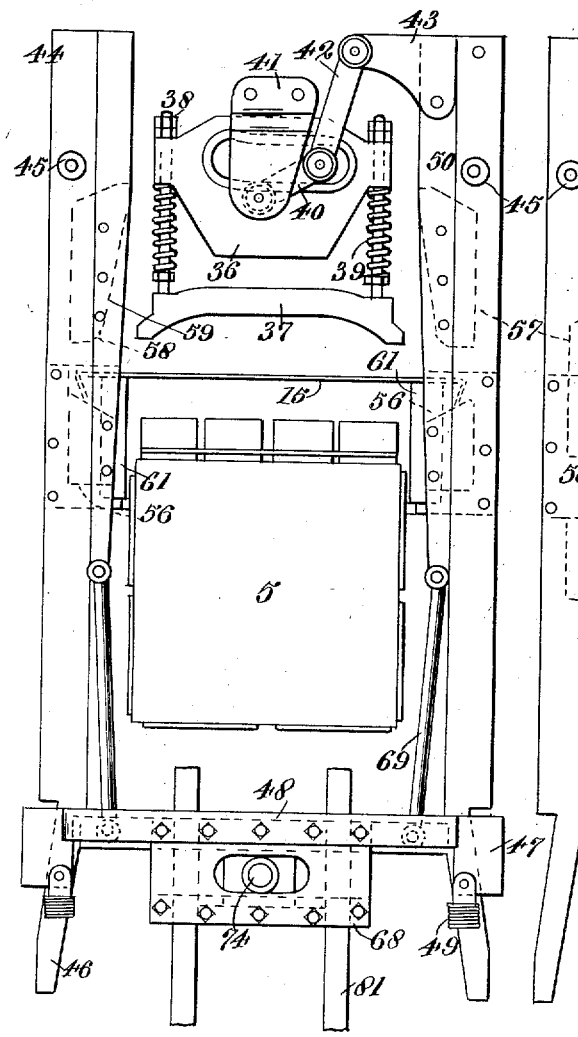
Figures 5, 6, 7 and 8 show rear elevation skeleton views of the movable cross head, presser foot and strap driving elements with associated parts illustrating successive progressive stages of action of the parts in applying a strap to secure the cover on an orange box.
Figure 6:
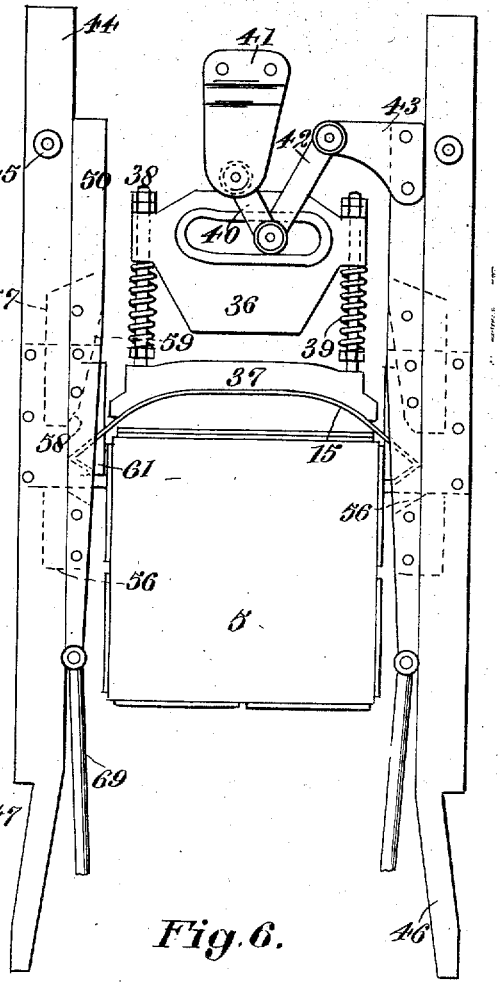
Figure 27:
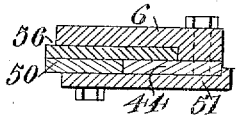
Figure 27 is a detail horizontal sectional view of one of the chuck plates and drive bar, and guides taken on line 27—27 of Figure 2.
Figure 28:
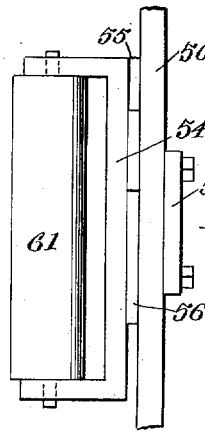
Figure 28 is an inside elevation of that portion of the drive bar and chuck plate shown in Figure 27.

The strap driving mechanism is mounted on the central uprights 6 and 7 and includes a pair of substantially elongated strap drive bar guides 44 which are pivotally mounted at their upper ends at the points indicated at 45, in Figure 1 and Figures 5 to 6 inclusive, on bosses shown at 9', Figure 2, formed integral with the central frame tie 9. The lower ends of the guides 44 are formed with angularly extending ends 46, shown clearly in Figures 5 to 8, inclusive, upon which slide the gibs 47, shown in Figures 1, 2, 5 and 8, carried by the lock bar 48, positioned below the side bars of the roller conveyor table. This lock bar is adapted for limited sliding movement to operate the gibs along the incline of the projection 46, so that the drive bars are moved on their pivots 45, so that through the operation of these gibs compensation may be made for the varying widths of boxes being operated on by the machine, in driving the strap covers thereon. Suitable coil springs, normally under tension are indicated at 49, and have one end anchored to the gibs 47, at each side of the machine, as shown in Figure 1, while the opposite ends are anchored to the bottom frame tie 11, and normally serve to move the lock bar 48 downwardly, with the gibs, so as to move the drive bar guides inwardly during the driving operations, for driving a strap in a box in the manner as will be hereinafter more clearly described. The drive bars 50 are mounted on the inner opposed edges of the drive bar guides 44 and are retained in slidable engagement with the guides 44 by the gibs 51 and 52 respectively. There are four of these gibs, three numbered 51, which are of similar construction, while the gib 52 has the addition of an operating projection 53 as clearly shown in Figure 1, adapted for engagement with and operation of the trigger 32 on the shaft 22, for operating the strap feed mechanism heretofore described. As shown in Figure 1, a pair of gibs are used to secure the drive bar 50 in slidable engagement with its guide 44. A strap chuck plate 54 is secured to the side of each drive bar guide 44 adjacent to and immediately below the central frame tie 9. These chuck plates 54 are secured to the guide bars 44 adjacent the outer edges thereof, while the inner edges of the chuck plates are formed with cut away portions adjacent to the drive bar guides for cooperation therewith to provide guideways clearly shown in Figures 27 and 28 for the opposite ends of the straps 15 after they leave the feeding mechanism, and as they fall from the lips 29 on the castings 19. These guideways are formed by the cooperation of the chuck plates 54 and the drive bar guides 44 and drive bars 50 and are wider at the top as indicated at 55, so that the ends on the straps 15 will be positively received in the guideways and moved into the proper positions as they move downwardly in these guideways until they rest on the stop plates 56, secured to the drive bars. These stop plates have downwardly and inwardly inclined upper faces which receive and support the straps in the driving mechanism and the guideway as more clearly shown in Figure 5. These stop plates 56 are formed so that they slidably fit and substantially fill the guideways formed between the drive bars, the guide bars and the chuck plates, and in the operation of the drive bars which will presently appear, move from the position shown in Figure 5, between the chuck plates and the guide bars downwardly to the position shown in Figure 7, substantially below the chuck plates. This permits, as will be described, of the lowering of a strap onto the top of a box being strapped in the machine, for the proper operation of the mechanism in securing the strap to the box. The chuck plates 54 are mounted on the drive bar guides 44 and are of such a length that the ends of the straps being applied to a box are always in the guideways formed therein until they are fully driven into the box, by the operation of the drive wedges 57 secured to the drive bars 50 above the stop plates 56 a sufficient distance as shown in Figures 5 to 8, so that they will be positioned above the lower end of the strap magazine to permit the feeding of the lower strap in the magazine into the driving mechanism at the end of each driving operation. These drive wedges 57 are of a size that they will slidably move through the guideways formed between the chuck plates 54 and the drive bar guides 44, in order that the lower rounded ends 58 will engage the ends of the strap in the guideway, and force the same downwardly and inwardly into the box being strapped, after the same is formed to fit the box by the press shoe 37, the final driving operation being obtained by the elongated inclined faces 59, on the inner edges of each of the drive wedges 57.

Figures 5 to 8, inclusive, show the progressive stages of operation of the driving mechanism for placing and securing a strap across the cover of a box, in which the parts are shown in the upper limits of movement in Figure 5, while Figure 6 illustrates the first portion of the downward movement of the press shoe cross head 36 and the drive bar 50 with the associated parts attached to the box.

As will be understood by those skilled in the art of packing fruit, it is the common practice, particularly in the citrus industry, to fill the box with the fruit not only to the upper limits of the side walls of the box but to a considerable distance above the side walls of the box in what is known as the "overpack". This overpack, or excess fruit, piled upon the box allows for the shrinkage of the fruit during shipment and storage so that after shrinkage and storage of the fruit the box will remain full even though the fruit has shrunk to a considerable extent. It is, therefore, necessary that the cover when placed upon the box shall not lie in flat alignment with the upper edges of the box but shall bulge upwardly to accommodate this extending or overpacked fruit. Thus the strap, when placed upon the box, must hold the bulged cover down upon the box in such compressing relation as to cause the cover of the box to follow down the receding fruit as the fruit shrinks. Also, the covers are secured to the boxes of fruit by laying the cover upon the extending or protruding fruit and bending or springing the ends of the cover down into contact with the box ends where they are nailed, thus leaving the central portion of the lid bulged upwardly to accommodate the protruding fruit. The strap which is employed must, therefore, be placed over and across the cover at the bulged portions thereof, preferably across the transverse center of the bulged cover.

In Figure 6 the press shoe which is disposed across the transverse center of the bulged cover of the box has engaged the cover of the box and pressed the same downwardly toward the box, thus compressing the cover upon the fruit and further compressing the fruit down toward the interior of the box to a level considerably below the original level of the protruding fruit as it was originally packed. Also the press shoe being curved upon its lower surface has bent the cover into an arcuate form so that the strap now engaged by the press shoe will likewise be bent slightly to conform with the arcuate shape produced upon the cover of the box. In this movement downwardly of the drive bars, the stop plates 56 have moved downwardly below the lower ends of the strap, the ends of which are still guided between the drive bars and the chuck plates 54, while the drive wedges 57 have moved downwardly a considerable distance and are approaching their operative positions.

Figure 7:
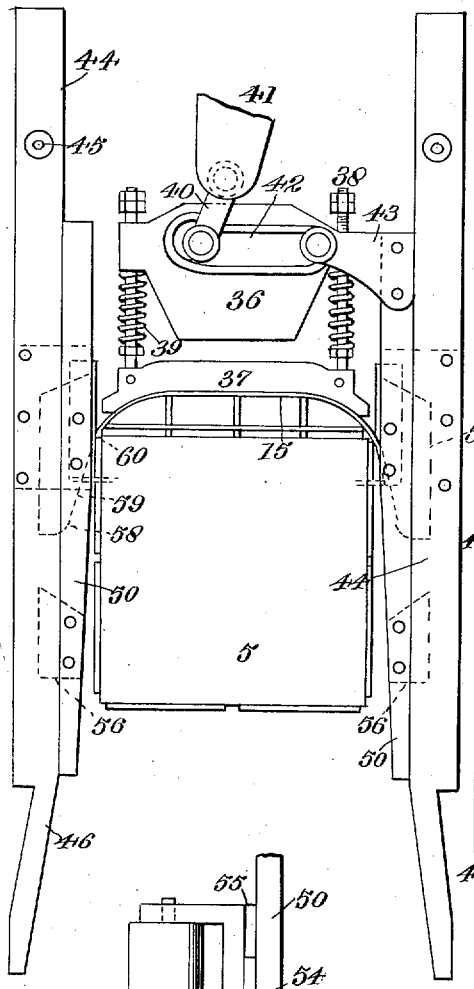

In the further downward movement of the drive bars, the press shoe is moved to its lower limit of movement by the downward motion of the bracket 43 carried by one of the drive bars 50, as clearly shown in the several figures of the drawings, and the radius link has moved into the curved portion of the horizontal slot as shown in Figure 7. This further downward movement of the drive bars 50 brings the drive wedges 57 into operation so that the rounded corners 58 have engaged and moved the ends of the straps being applied to the box inwardly into the box and the inclined edges 59 have been brought into play to force the laterally extended sharpened end of the strap into the sides of the box about one-half of their length. The drive bars 50 move still further downwardly to the position shown in Figure 8, which is the lower limit of movement of the said drive bars and at which point the straight faces on the drive wedges have forced the ends of the strap into the finally secured position into the box and completes the strapping operation of the box. The further operation of the machine moves the drive bars and the several associated parts upwardly to the position shown at the upper limit of movement which raises the press shoe cross head together with the press shoe so as to permit the discharge of the strapped box and the insertion of another box to be strapped. The chuck plates are provided with ears in which are rotatably mounted the vertical rollers 61, which serve to crowd fruit projecting over the box into the same under the cover before the press shoe engages the cover and during the movement of the box into strapping position, as shown in Figure 2.

Figures 3, 4:
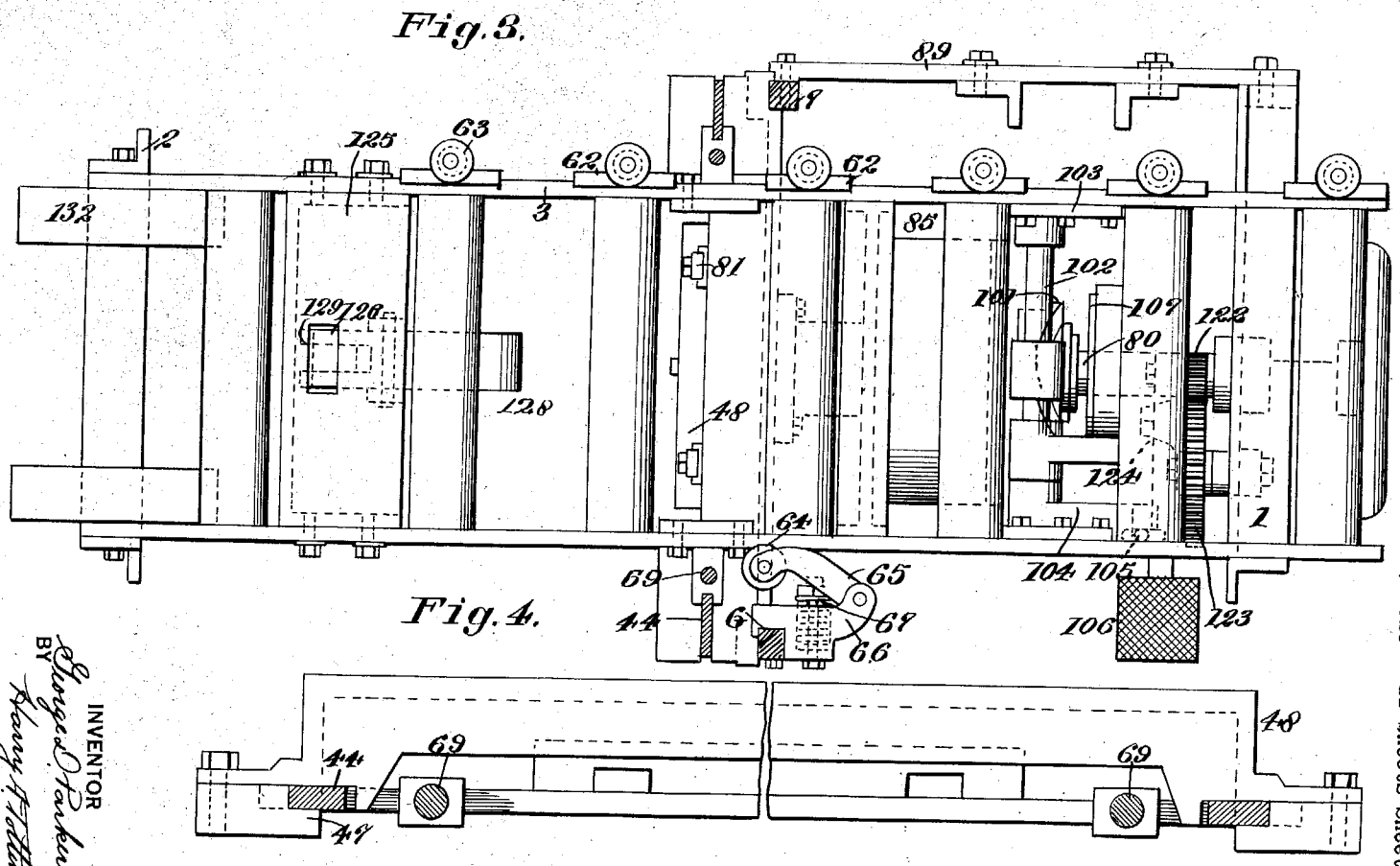
Figure 3 is a horizontal sectional view, taken substantially on line 3—3 of Figure 1, showing the table rollers in plan view and illustrating substantial portions of the operating mechanism below the table.
Figure 4 is a detail plan view of the locking bars and a portion of the associated structure of the machine.

A plurality of brackets 62 are mounted on the table rail 3 at one side of the machine and as illustrated in the drawings, particularly Figures 1, 2 and 3 are on the side of the table rail adjacent to the central upright 7. Rollers 63 are rotatable on the upper ends of these brackets 62 above the conveyor rollers 4 and are adapted to engage the side of the box 5, moving on the rollers 4 through the machine. At the opposite side of the machine is mounted the movable roller 64, in the free ends of the swinging bracket 65, mounted at its opposite end in the block member 66 secured to the central upright 6 of the main frame. A suitable coil spring 67 mounted in a socket in the block 66 engages the swinging bracket 65 and normally projects the roller 64 into the path of the box 5 moving into strapping position and serves to project the box against the rollers 63 so that all boxes are operated on in the machine with one side in a predetermined position. In this way all boxes are uniformly guided through the machine into the strapping position, and variation in width of the different boxes is compensated for by the movable bracket 65 as well as by the operation of the drive bar guides 44, through the downward movement of the gibs 47 on the inclined ends 46 of said guides.

Figure 18:
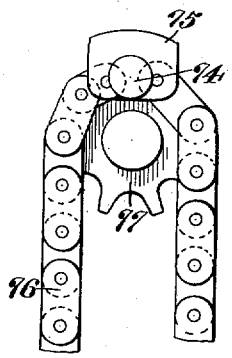
Figure 18 is an enlarged detail showing the roller chain and the drive pin carried thereby for operating the cross head.
Figure 17:
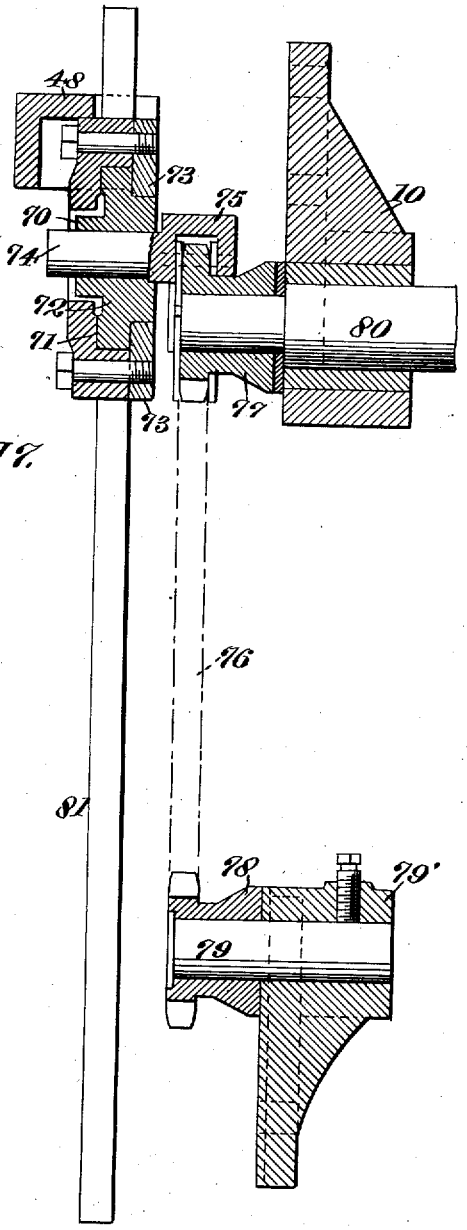
Figure 17 shows a vertical sectional view, through the cross head driving mechanism.

The operating means for the drive bars and associated elements heretofore described includes a cross head 68 having lateral projections from the upper end portion extending outwardly from the sides to which are pivotally secured the lower ends of the connecting rods 69 which have their upper ends pivotally connected to the lower ends of the drive bars 50 and in the reciprocating vertical movement of the crosshead 68 the entire mechanism for feeding and applying a strap to a box is operated. The ends of the projections are inclined similar to the inclined projections 46 on the drive bar guides, and are positioned so that when the cross head 68 reaches the upper limit of movement as shown in Fig. 5, the inclined edges will engage the projections 46 and force the drive bar guides outwardly to the position shown in Figure 5, releasing the box just strapped so that it may be conveyed outwardly from the strapping mechanism and the next box placed therein. This cross head is formed with a horizontal slot 70 and a guideway 71 above and below the slot and in one side of the cross head for slidably receiving the sliding block 72 arranged in the cross head by means of the retaining bars 73 suitably bolted to the cross head. This slide block 72 receives the stud 74 on the special link 75 as clearly shown in Figure 17, of the drive chain 76, shown clearly in Figures 1 and 2. This drive chain and the special link structure is shown in detail in Figure 18 and is mounted over the drive sprocket 77, at the upper end which is suitably and rotatably supported in the table frame carriage 10, while the lower drive sprocket 78 and idler sprocket is rotatable on the shaft 79 mounted in the bracket 79′ adjustably bolted to the lower frame tie 11 so that compensation for slack in the chain may be made through adjustment of the bracket 79′. The drive sprocket 77 is rigidly mounted on the drive shaft 80 which is rotatable in a suitable bearing in the table frame tie 10. The cross head 68 is provided with vertical guides slidably receiving the spaced parallel guide bars 81, which are secured at their opposite ends to the frame tie 10 and the bottom frame tie 11, and on which the cross head reciprocates in its operation during the travel of the special link 75 over the sprockets 77 and 78, in the operation of the drive chain through power applied to rotate the shaft 80.

The cross head 68 is formed to engage the lock bar 48 in order to provide for the reciprocating motion thereof upwardly to the position shown in Figure 1, which is its upper limit of movement, while the downward movement of the lock bar and gibs 47 secured thereto is limited by the stop plates 82, clearly shown in Figures 1 and 2 secured to the central uprights 6 and 7.

The shaft 80 in addition to having the rotatable bearing in the table frame tie 10 extends to and has a bearing in the frame 2, the end portion of the shaft extending through the bearing in end frame 1 and mounting a combined hand wheel and fly wheel 83 as shown in Fig. 2. The power driving mechanism for the drive shaft 80 includes the clutch pulley 84 with which is formed the clutch drum 85, which is rotatably mounted on the shaft adjacent to the frame tie 10 as clearly shown in Figure 2. The clutch pulley 84 is driven by a silent chain drive 86 from the drive pinion 87, on the motor shaft of the electric motor 88. This electric motor is adjustably mounted in a desired manner on the plate member 89 secured to one side of the end frame 1 at one end portion and to the vertical upright 7 at its opposite end, as shown in Figure 2, also Figure 3.

Adjacent to the hub of the clutch drive pulley 84 within the clutch arm 85, the friction clutch hub 90 shown, particularly in Figures 25 and 26, is mounted on the shaft 80 and suitably keyed or otherwise secured thereto against rotation. An annular disc 91 projects from the hub 90 and is provided with lugs and gibs 92 which freely engage the projections on the expanding friction ring 93, which has free movement on the disc 91, but is held against rotation thereon. This friction ring is formed with abutments 94 adjacent the opposite ends thereof, one of which abuts against the stop screw 95 adjustably mounted in the block 96, formed on disc 91, while the expanding lever 97 engages the other abutment and is pivoted intermediate its ends on the disc 91 having the opposite free end thereof extending into the slotted portion of the hub 90 for registry with the opening 98, into which slidably extends the wedge-shaped operating pin 99, adapted to engage the expanding lever and to rotate the same on its pivot for expanding the band 93 to engage the drum 85, which operation will be presently described. This wedge-shaped operating pin is carried by the sliding spool 100, as shown in Figure 2, which receives the yoke 101 mounted on the main control shaft 102 rotatable in bearings 103 mounted on the side bars 3 of the table frame. The shaft 102 extends transversely across the machine under the table frame, as shown clearly in Figure 3. The control shaft 102 is provided adjacent the right-hand end as shown in Figure 1 with an operating arm 104 clearly shown in Figure 3, with the free end of which is pivotally connected the rod 105 having the opposite end extending downwardly and pivotally connected to the foot operated control pedal 106 pivotally mounted on the end frame 1. Through this structure, the depression of the pedal 106 serves to move the clutch operated wedge 99 into the opening 98 for operating the expanding lever 97, and connecting the drive shaft 80 with the source of power at 88.

Figure 24:
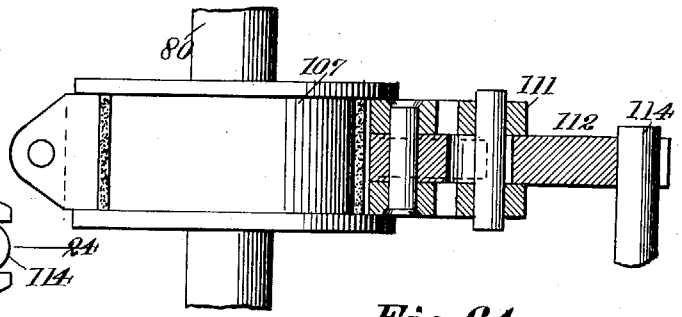
Figure 24 is a horizontal sectional view, taken on the line 24—24 of Figure 22.
Figure 23:
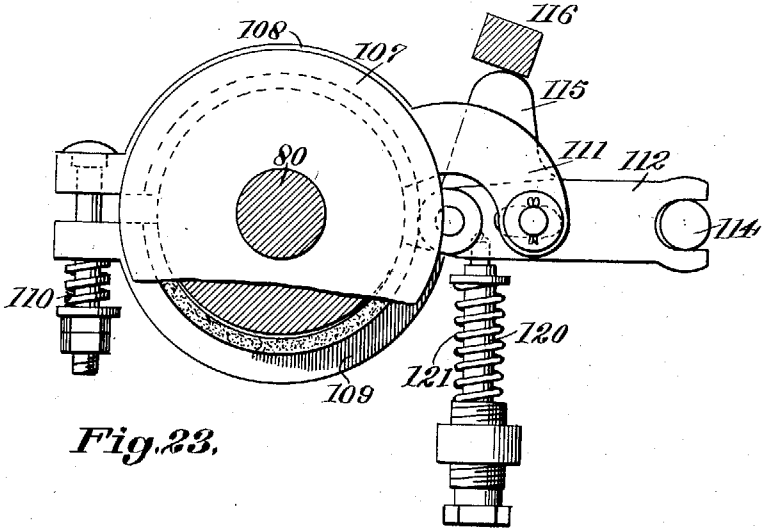
Figures 22 and 23 show two extremes of the braking mechanism for bringing the machine to rest after each cycle of operation.
Figure 22:
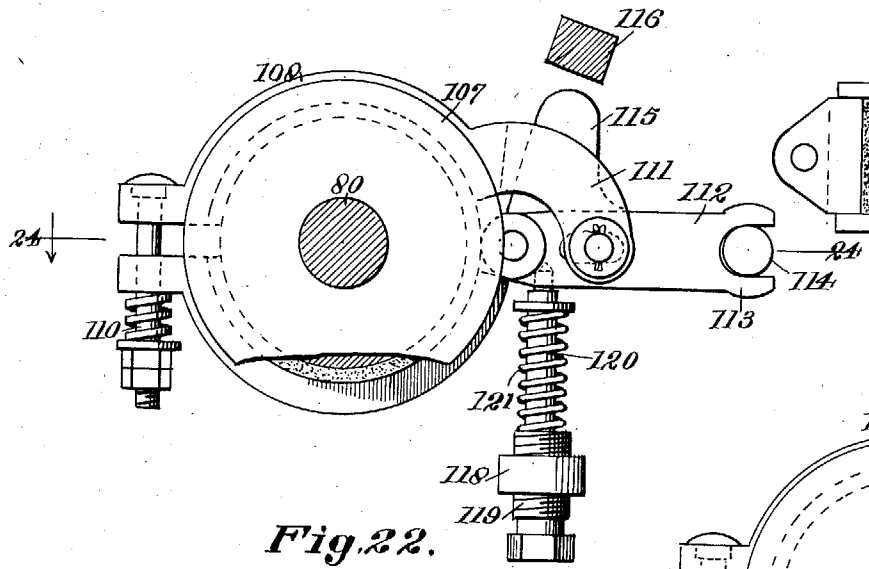

An automatic brake is provided for controlling and stopping the main drive shaft 80, which includes the brake drum 107 mounted on shaft 80, as clearly shown in Figure 2, adjacent to the spool 100. The brake drum is shown in detail on an enlarged scale in Figures 23 to 24 inclusive. A pair of brake band sections 108 and 109 of substantially semi-annular form are mounted for cooperation with the drum 107 and have a connection at 110 including a cushioned spring surrounding the connecting bolt for the ends of the sections, the tension of which is adjustable through the lock nuts mounted on the bolts. This connection is provided to prevent too sudden action of the brake in gripping the drum during the operation to rotate the shaft 80. The opposite free end of the section 108 is provided with an arcuate projection 111, to the end portion of which is secured the lever 112 through a suitable slot and pin connection, as clearly illustrated in Figures 22 and 24, one end of the lever being pivotally secured to the free end of the band section 109, while the opposite end of the lever is bifurcated as illustrated at 113, to receive the pin 114 mounted on the end frame 1 of the main frame work. The lever 112 is provided with a lateral upwardly extending projection 115 with which the arm 116 is adapted for engagement in the operation of the brake, the arm 116 being mounted on shaft 102 in rigid connection therewith, so that the depression of the foot pedal 106 provides for the operation of the arm. A pin 117 mounted on the end frame 1 below the pin 114 as shown in Figure 2, rotatably mounts a collar 118 in the end thereof, in which is threadably mounted the bushing 119, for slidably receiving a rod 120 which is engaged in a socket formed in the lower edge of the lever 112 and provided with a shoulder adjacent the end thereof, against which abuts the compression spring 121, having the opposite end seated on the end of the sleeve 119. This sleeve is adjustable to vary the tension of the spring 121, which normally operates the lever 112 to move the projection 115 upwardly toward the arm 116, which operation will operate to contract sections 108 and 109, so as to engage the drum 107 and exert a braking action thereon for stopping the shaft 80.

From the above description, it will now be understood that when the arm 116 is forced upward, as hereinafter explained, it will be moved toward the upward limit of its movement to the position shown in Figure 2, which will operate the collar 100 to withdraw the wedge 99 from the clutch permitting the release of the clutch drum 85, while the arm 116 moves upwardly and permits the spring 121 to operate the brake and stop the shaft 80.

The drive shaft 80 is formed at 122 as shown clearly in Figure 3, with gear teeth intermeshing with the cam gear 123 shown in Figures 2 and 3, this cam gear being rotatably mounted on a stub shaft carried by the end frame 1. This cam gear 123 is provided with an operating cam 124, as shown in Figure 2, which moves in the path of the arm 116, and serves to raise the arm and disengage the power from the shaft 80 to stop the machine at the completion of each stroke of the mechanism of the machine for applying a strap to the box. This timing of the operation of the machine is obtained through predetermining the number of teeth in the sprocket wheels 77 and 78 in comparison with the number of teeth in the chain 76, so that the drive shaft 80 makes four revolutions for one complete revolution of the chain, while there are four times as many teeth in the gear 123 as in the gear 122 on the main drive shaft 80 resulting in the rotation of the gear 123 and a single operation of the cam on arm 116 for each complete operation of the strapping mechanism heretofore described.

Figure 15:
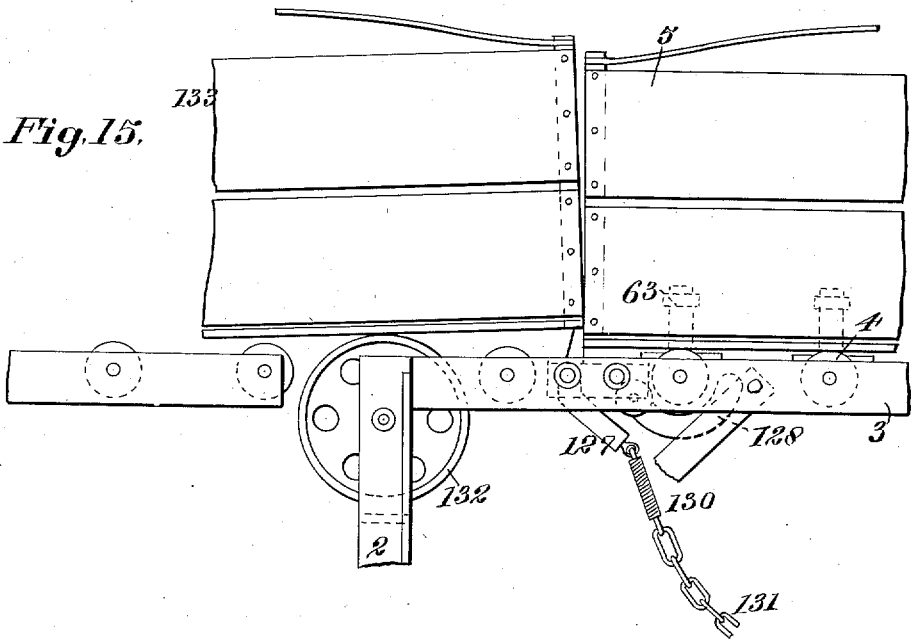
Figures 15 and 16 show a side elevation of a portion of the table mechanism, illustrating the operation of the automatic disappearing box stop.

The automatically disappearing box stop mechanism which controls the movement and positioning of boxes during the strapping operation in the machine is more clearly illustrated in Figures 2, 3, 15 and 16. The stop mechanism includes the frame tie plate 125 as clearly shown in Figure 3, secured between the side rails 3 of the conveyor table by suitable bolt and slot connections to permit the longitudinal adjustment of the frame tie for obtaining the adjustment of the stop mechanism as will presently appear. The central portion of the frame tie 125 has an opening 126 formed therein, through which operates the stop 127, which is in the form of a weighted lever pivoted intermediate its ends in the end portion of the counter-balanced lever 128, pivotally mounted between ears depending from the frame tie 125. This counter-balancing lever 128 normally operates to move the stop lever 127, into the position shown in Figure 15, while the stop lever 127 normally tends to assume the position shown in Figure 16 due to the angularly extending weighted end, in spaced relation from the stop shoulder 129 formed by the opening 126, as an abutment for the stop lever to arrest the motion of the box 5 in strapping position as shown in Figure 15. The end of the stop lever 127 is attached to the coil spring 130 to which is connected the chain 131 extending to and connected to the cross head 68 so the stop will be operated in proper timed relation with the cross head. This operation of the stop is occasioned through the downward movement of the cross head after the box is moved into the strapping position as shown in Figure 15 and the pedal 106 depressed for the operation of the machine to apply the strap so that as the cross head reaches the bottom limit of its stroke of movement, it will operate the chain 131, and move the stop 127 downwardly from the position shown in Figure 15, disengaging from abutment with the shoulder 129 and upon slackening of the chain 131 the stop lever swings on its pivot in the counterbalanced lever to the position shown in Figure 16, and in being moved upwardly by the lever, it engages under the end of the box being strapped as the strapping operation is completed. This permits the movement of the box 5 outwardly from strapping position as it is completed, in order that the next successive box may be pushed into strapping position and the strapped boxes ejected from the machine and conveyed along the rollers 4. In order that the stop can assume the position shown in Figure 15 to arrest the motion of the next box moving into strapping position as the strapped box is discharged, there is provided a pair of substantially large conveyor rollers 132 mounted in the end frame 2, which have their peripheries extending above the horizontal plane of the rollers 4, so as to elevate the strapped boxes as they move outwardly from the strapping position, in order that the central portion of the box will pass over the center of the rollers 132, before the next box moving into position reaches the point of engagement with the stop 120, that is, the distance between the axis of the rollers 132 and stop 127 is less than half the length of the box being strapped. The strapped box in being discharged from strapping position moves into the position of the box shown at 133, in Figure 15, with the rear end elevated above the roll 4 between the side bars 3 of the table frame which permits the counter balanced lever 128 to move the stop member 127 upwardly so that the box 5 moving into strapping position will engage the free end of the stop lever and its motion will be arrested by the engagement of this lever against the shoulder 129 of the frame tie 125. It will then be in position for the strapping operation which will be obtained through the operation of the previously described mechanism by depressing the foot pedal 106.

Figure 19:
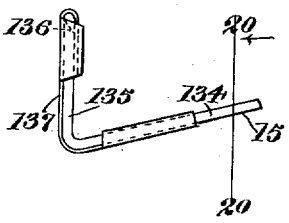
Figure 19 shows an end elevation of one end portion of a filler card for the strap magazine, illustrating the manner of securing the strap in assembled relation.
Figure 20:
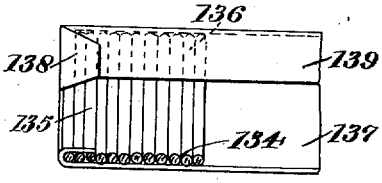
Figure 20 is a sectional view, taken on the line 20—20 of Figure 19.
Figure 21:
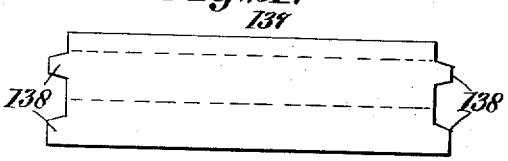
Figure 21 is a plan view of the sheet metal envelope adapted for cooperation with a plurality of straps to form the filler card before the same is formed.

In carrying out the method for making straps, cards of the straps to form filler cards for the magazine of the strapping machine and to obtain the successive steps in applying the straps and securing the ends in the box to secure the cover thereon, the first step of the method consists in obtaining suitable wire strips of metal or material of a suitable character, for the formation of the strap and cutting the same into predetermined lengths to form a series of straps. As each strap is formed, the ends are sharpened and a predetermined portion of the end is extended laterally by suitable bending or the like. Each strap 15 therefore comprises an elongated central portion 134, as shown in Figure 19, provided with a driving end extended laterally from each end portion, as shown at 135, which is formed with a sharpened end as indicated at 136. After the formation of these straps from suitable wire or the like, the same are preferably, for use in the machine heretofore described, secured into suitable form to provide a filler card of a plurality of straps assembled in predetermined relation for positioning in the magazine of the machine. For this purpose there is provided a strap retainer card formed from a piece of sheet material as shown at 137 in Figure 21, provided with a plurality of projections 138 on the opposite ends thereof. This strip of metal is bent along a longitudinal line intermediate the projections 138 into an angular form as shown in Figures 19 and 20 to conform to the contour of the end portions of the strap 15. One edge portion of the card 87 is provided with an overturned flange 139 spaced from the remaining portion of the strip to provide a guideway for receiving the sharpened ends 136 of the straps so that they may be assembled in the relation shown in Figures 19 and 20, in which all of the straps lie in similar relation with all of the ends 135 extending in the same direction and in superposed position in the cards 137, one card being applied to each end of the strap. In this way a card or filler of say 100 straps may be secured in the assembled relation shown in Figures 19 and 20 and the ends formed to extend over the end straps in the filler to retain them in rigid assembled relation to form filler cards for the magazine of the strapping machine.

After these filler cards are formed by the several steps of the method above set forth, preparation is then made for the strapping of the boxes through the use of the above described machine, and for this purpose the latches 17 are raised to permit the end sections 16 on the retaining plates of the strap magazine to be moved downwardly in the direction of the arrow in Figure 2, so that a filler card may be positioned in the magazine, the straps being in the position shown in Figure 12. The projections 138 are then bent backwardly to release the card 137 from the straps 15 after they have been positioned in the magazine, so that a suitable supply of straps is fed to the magazine to properly fill the same following which the sections 16 of the retainer plates are moved into the position shown in Figure 2, and the latches 17 permitted to drop into locked position for retaining the sections in closed position.

Figure 8:
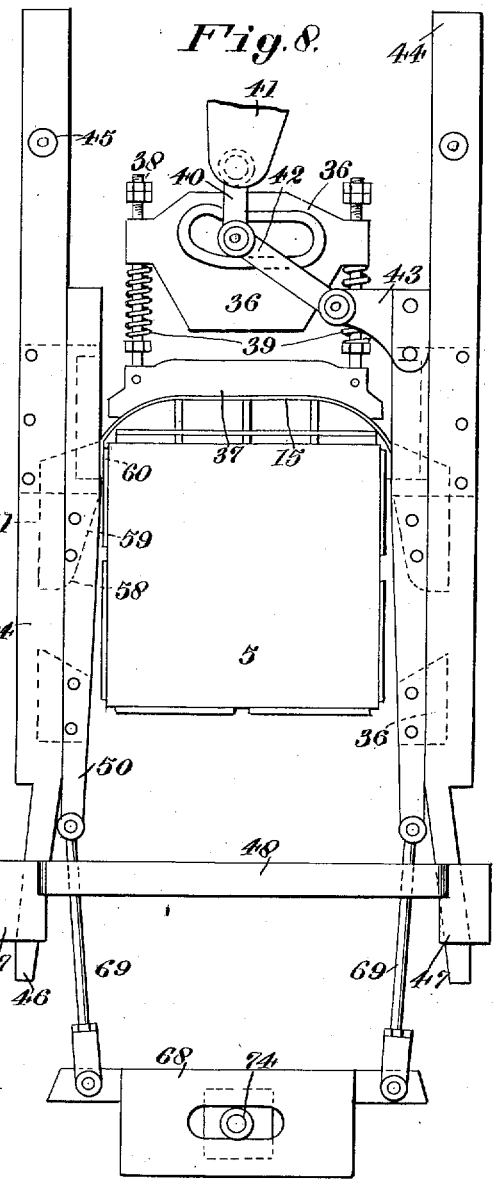
Figure 16:
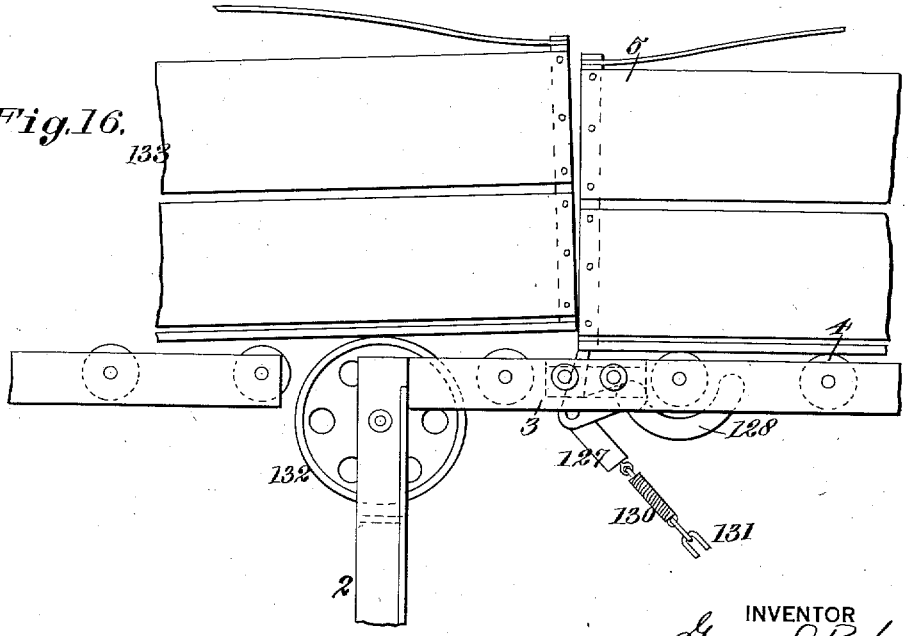

Then, boxes to be strapped are fed along the conveyor table on rollers 4 into the machine from the right hand end as shown in Figure 2, in single file. The boxes are fed to the machine along the rollers 4, in this single file, by allowing the ends of the boxes to engage one another, so that they are pushed one by one through the strapping mechanism. As a box reaches the strapping position as shown in Figure 2, the stop 127 will engage the end thereof and through being limited in its pivotal movement by the shoulder 129 of the frame 125, its motion will be arrested in the proper position to receive a strap, which position is illustrated clearly in Figure 2. Then the operator depresses the foot pedal 126 which rotates the shaft 102 and operates the arm 116 to release the brake from engagement with the drum 107 and moves the collar 100 along the shaft 80 so that the wedging member 99 is moved into the opening 98 of the hub 90 for the operation of the expanding lever 97 to expand the band 93 and engage the stop screw 95. This will supply the power of the motor 88 for operating the shaft 80, which upon rotation drives the sprocket chain so that the cross head 68 will begin the downward stroke of movement from the position shown in Figure 5 to that shown in Figure 8. This moves the connecting rods 69 downwardly, drawing the drive bars 50 downwardly, which will cause the presser head and presser foot to be drawn downwardly to apply the strap resting on the stop plates 56 for application to the box top. The parts move downwardly from the position shown in Figure 5 to that of Figure 6, in which position a central portion of the strap is formed to fit the cover of the box and pressed tightly thereon, while the cover is compressed and forced downwardly onto the box and the fruit compressed therein. As the box is moved into strapping position, the rollers 61 in the chuck plate push any projecting fruit in under the cover, so that it is not bruised or damaged in pressing the top onto the box. After the forming of the central portion of the strap to fit the box, and the depression of the lid toward the box under compression as shown in Figure 6, the further downward movement of the drive bars with the cross head brings the drive wedges 57 into operation, and as above described, the inclined edges 59 form the end of the strap so that the driving ends 135 have the sharpened ends thereof forced into the sides of the box as shown in Figure 7. The chuck plates and drive bars in forming the guide ways for the end of the strap, guide the strap in the driving operation to this point, so that the driving ends are driven straight into the box. In the completion of the downward movement of the cross head 68 to the position shown in Figure 8, the faces 60 of the drive wedges come into play and engage the terminals of the straps, forcing the same completely into the box. The downward movement of the lock bar 48 with the gibs 47 moves the guide rails 44, so that the drive wedges closely engage the sides of the box and force the ends of the strap tightly in against the sides of the box as clearly shown in Figure 8, while the presser head is holding the cover and fruit compressed. In this way, the strap ends are securely fastened to the box. When the cross head 68 reaches the bottom of the strokes of movement as shown in Figure 8, it operates the chain 131 for operating the stop 127 from the position shown in Figure 15 to that shown in Figure 16, so that as the cross head moves upwardly, completing the stroke of movement, the stop 127 through the action of the weighted lower end will swing on its pivot on the counterbalance lever 128, in order that the end will engage under the end portion of the strapped box as shown in Figure 16, so that at the end of the stroke of movement of the machine, the strapped box may be easily discharged from the strapping position.

As the cross head moves upwardly, it will engage the lock bar 48 and move the same upwardly with it to the upward limit of movement, while the inclined edges of the ends of the projections of the cross head will engage the inclined inner edges of the guide bars 44 and move the same outwardly on their pivots, so that the drive bars are moved away from the sides of the box and the press head and press shoe moved upwardly to the position shown in Figure 5. As the cross head and drive bars reach the upward limit of movement, the gib 52 has its projection 53 engaging the trigger 32 and operates the strap feed mechanism so that the strap feed dogs project the lower strap from the strap magazine to permit the same to extend outwardly therefrom into the driving mechanism in a manner as heretofore described. This positions another strap in position in the driving mechanism on the stop plates 56, ready for the next strapping operation on the next succeeding box. When the cross head reaches the upper limit of movement shown in Figure 5 after strapping the box, the cam 124 on the cam gear 123 engages the arm 116 and moves the foot pedal 106 upwardly, through the rotation of the control shaft 102, which moves the collar 100 into the position shown in Figure 2 on shaft 80 and withdraws the wedge 99 from engagement with the expanding lever of the clutch mechanism thereby releasing the driving mechanism from operation by the motor 88, and thereby permitting the gear 84 and drum 85 to rotate freely on shaft 80. At the same time, the coil spring 121 will operate the lever 112 so that the brake band sections 108 and 109 will be moved into engagement with the drum 107 and arrest the motion of the shaft 80 and the parts of the machine operated thereby so that the cross head will be stopped at its upward limit of movement with the parts of the driving mechanism in position as shown in Figure 5. At this point, the operator may shove the boxes along on the conveyor rollers 4 so that the strapped box will move toward the left hand end of Figure 2 over the stop and ride over the rollers 132, the next box immediately following as is shown in Figure 15, so that as the box reaches the position of the box 133 in Figure 15, it will overbalance on the rollers 132 and the next succeeding box through the projection of the stop 127 will be stopped in proper strapping relation for the next operation of the machine.

It should be clear from the above description that a new method of strapping boxes or containers of any character including the method of making the straps from any suitable material adapted for the purpose and the application thereof to the boxes has been provided, in addition to the special assembly of a group of straps to form filler cards and the provision of a special machine for applying the straps to the boxes in automatic operation in order to dispense with the large amount of time, labor and difficulty now experienced in the art of box strapping, through numerous laborious methods in use. Operation of the strapping machine in carrying out the final steps in the method after the forming of the straps and cards for the purpose of feeding and applying the straps to the boxes to secure the covers thereon is such that each part is timed in its operation with relation to the other parts, in order that the proper sequence of movements will take place to properly apply the straps to the box in tensioned relation, and thus the straps with their preformed ends are placed transversely across the bulged covers of the fruit boxes, the covers being independently depressed below the level of the fruit as it was originally overpacked in the box and while holding the cover so compressed the strap is formed around the edges of the cover and secured to the side walls of the box by driving the preformed ends thereof into the side walls of the box with the strap in such relation to the compressed cover of the box that when pressure is released from the box the rebound of the cover will draw the strap into tensioned relation so that the tensioned strap will hold the cover compressed upon the fruit and will hold the protruding fruit compressed within the box to take up the shrinkage of the fruit during transportation and storage, as distinguished from prior methods in which a band or other strap was drawn tight across the box and fastened thereto.

What is claimed:

1. The method of applying straps to the covers of overpacked fruit boxes, which consists in forming, from a strip of material, a strap having driving ends, applying pressure to the cover of the box to compress the overpacked fruit toward the box, disposing the strap across said depressed cover in close relation thereto, and securing the driving ends of said strap to said box prior to the release of pressure upon said cover.

2. The method of applying straps to the covers of fruit boxes, the contents of which are originally packed to extend to a level above the sides of the box, which consists in forming, from a strip of material, a strap having driving ends, applying pressure to said cover to compress the cover and the extending fruit below the original level of the fruit, disposing said strap across said compressed cover, securing the driving ends of said strap to said box while said strap is in close relation to said cover, and then releasing pressure on said cover whereby said released cover will be held in compressed relation upon the fruit.

3. The method of applying straps across the covers of fruit boxes, the contents of which are originally packed to extend to a level above the sides of the box, which consists in forming, from a strip of material, a strap having driving ends, applying pressure upon said cover to compress a transverse portion thereof upon the fruit to a level below the original level of the fruit, disposing said strap across the compressed portion of said cover, securing the driving ends of said strap to said box while said strap is in close relation to said compressed cover, and then releasing the pressure on said cover whereby said cover, when released, will be held by said strap at a level below the original level of said fruit.

4. The method of applying straps across the covers of fruit boxes, the contents of which are originally packed to extend to a level above the sides of the box, which consists in forming, from a strip of material, a strap having driving ends, applying pressure upon said cover to compress a transverse portion thereof upon the fruit to a level below the original level of the fruit, disposing said strap across the compressed portion of said cover, driving the ends of said strap into said box while holding said cover compressed to hold said strap at a level below the original level of said fruit and then releasing pressure upon said cover, whereby said released cover is held by said strap at a level below the original level of said fruit.

5. The method of applying straps across the covers of fruit boxes, the contents of which are originally packed to extend to a level above the sides of the box, which consists in forming, from a strip of material, a strap having driving ends, applying pressure upon said cover to compress a transverse portion thereof upon the fruit to a level below the original level of the fruit, disposing said strap across the compressed portion of said cover, bending the ends of said strap over the edges of said cover and securing said driving ends to said box to secure said strap in close relation to said compressed cover, and then releasing the pressure on said cover whereby said strap will hold said released cover in compressed relation upon said fruit.

6. The method of applying straps to the covers of overpacked fruit boxes, which consists in forming, from a strip of material, a strap having driving ends, applying pressure to the cover of the box to compress the overpacked fruit toward the box, disposing the strap across said depressed cover and securing the driving ends thereof to said box with the strap in such relation to said depressed cover that the cover, upon subsequent release of said pressure, will tension the strap thereon.

DONALD PARKER,
CITIZENS NATIONAL TRUST AND
SAVINGS BANK OF RIVERSIDE,
By JERRE G. REED,
*Trust Officer,*
*Administrators with the Will Annexed of the Estate of George D. Parker, Deceased.*